(12) United States Patent
Yang et al.

(10) Patent No.: US 11,178,460 B2
(45) Date of Patent: Nov. 16, 2021

(54) SYSTEMS AND METHODS FOR PROVIDING INFORMATION RELATED TO TAGGED ITEMS REPRESENTED IN VIDEO STREAM CONTENT

(71) Applicant: DISH Technologies L.L.C., Englewood, CO (US)

(72) Inventors: Yunfeng Yang, Aurora, CO (US); William Joseph Ivanich, Parker, CO (US); Bin Xu, Aurora, CO (US); XinHua Yang, Aurora, CO (US)

(73) Assignee: Dish Technologies L.L.C., Englewood, CO (US)

( * ) Notice: Subject to any disclaimer, the term of this patent is extended or adjusted under 35 U.S.C. 154(b) by 0 days.

(21) Appl. No.: 16/371,591

(22) Filed: Apr. 1, 2019

(65) Prior Publication Data

US 2019/0230415 A1    Jul. 25, 2019

Related U.S. Application Data

(63) Continuation of application No. 15/198,796, filed on Jun. 30, 2016, now Pat. No. 10,291,962, which is a
(Continued)

(51) Int. Cl.
*H04N 21/4725* (2011.01)
*H04N 21/478* (2011.01)
(Continued)

(52) U.S. Cl.
CPC ..... *H04N 21/4725* (2013.01); *G06Q 30/0241* (2013.01); *G06Q 30/0257* (2013.01);
(Continued)

(58) Field of Classification Search
CPC ........... H04N 21/4722; H04N 21/4725; H04N 21/47815; H04N 21/812; H04N 21/858;
(Continued)

(56) References Cited

U.S. PATENT DOCUMENTS 7,120,924 B1 * 10/2006 Katcher ................... H04N 1/64
725/60
9,420,343 B2    8/2016 Yang et al.
(Continued)

OTHER PUBLICATIONS

U.S. Appl. No. 14/214,147, filed Mar. 14, 2014 Non-Final Rejection dated Jan. 7, 2015, all pages.
(Continued)

*Primary Examiner* — Jeremy S Duffield
(74) *Attorney, Agent, or Firm* — Kilpatrick Townsend & Stockton LLP

(57) ABSTRACT

Systems and methods directed advertising via a tagged video stream are provided. Content and a tag associated with a product represented by at least a portion of the content may be received by a media device. The media device may be associated with at least one end user. The content may correspond to television programming. The content may be output by the media device for display. A user selection corresponding to the tag associated with the product represented by at least the portion of the content may be processed by the media device. The user selection may be received during display of at least the portion of the content. Responsive to the user selection, the media device may facilitate provision of information related to the product represented by at least the portion of the content to a second device and/or an account associated with the at least one end user.

20 Claims, 5 Drawing Sheets

Related U.S. Application Data continuation of application No. 14/214,147, filed on Mar. 14, 2014, now Pat. No. 9,420,343.

(60) Provisional application No. 61/790,701, filed on Mar. 15, 2013.

(51) Int. Cl.
| | | |
|---|---|---|
| *H04N 21/81* | (2011.01) | |
| *H04N 21/4722* | (2011.01) | |
| *H04N 21/858* | (2011.01) | |
| *G06Q 30/02* | (2012.01) | |
| *H04N 21/475* | (2011.01) | |

(52) U.S. Cl.
CPC ..... *H04N 21/4722* (2013.01); *H04N 21/4751* (2013.01); *H04N 21/47815* (2013.01); *H04N 21/812* (2013.01); *H04N 21/858* (2013.01); *H04N 21/8583* (2013.01); *H04N 21/8586* (2013.01)

(58) Field of Classification Search
CPC ........... H04N 21/8583; H04N 21/8586; H04N 21/4751; G06Q 30/0241; G06Q 30/0257
See application file for complete search history.

(56) References Cited

U.S. PATENT DOCUMENTS

| | | | |
|---|---|---|---|
| 10,291,962 B2 | 5/2019 | Yang et al. | |
| 2002/0126990 A1* | 9/2002 | Rasmussen | H04N 7/17318 386/240 |
| 2003/0028873 A1* | 2/2003 | Lemmons | H04N 7/17318 725/36 |
| 2003/0229893 A1* | 12/2003 | Sgaraglino | H04L 67/36 725/37 |
| 2006/0031236 A1 | 2/2006 | Isogawa et al. | |
| 2006/0233191 A1 | 10/2006 | Pirzada et al. | |
| 2008/0148320 A1* | 6/2008 | Howcroft | H04N 21/4113 725/61 |
| 2008/0281684 A1* | 11/2008 | Stefanik | G06Q 30/0234 705/14.34 |
| 2008/0295129 A1* | 11/2008 | Laut | G06Q 30/02 725/34 |
| 2009/0083815 A1* | 3/2009 | McMaster | H04N 7/17318 725/110 |
| 2009/0092374 A1* | 4/2009 | Kulas | H04N 21/6125 386/248 |
| 2010/0023965 A1* | 1/2010 | Malik | H04N 21/435 725/32 |
| 2011/0307932 A1 | 12/2011 | Fan et al. | |
| 2012/0233641 A1 | 9/2012 | Gambino | |
| 2012/0240144 A1 | 9/2012 | Rose | |
| 2012/0289147 A1 | 11/2012 | Raleigh et al. | |
| 2013/0326563 A1 | 12/2013 | Mulcahy et al. | |
| 2014/0075319 A1 | 3/2014 | Kuo | |
| 2014/0245335 A1 | 8/2014 | Holden et al. | |
| 2014/0282638 A1 | 9/2014 | Pequignot | |
| 2014/0282715 A1 | 9/2014 | Yang et al. | |
| 2015/0296265 A1 | 10/2015 | Fan et al. | |
| 2016/0330521 A1 | 11/2016 | Yang et al. | |

OTHER PUBLICATIONS

U.S. Appl. No. 14/214,147, filed Mar. 14, 2014 Final Rejection dated Apr. 23, 2015, all pages.
U.S. Appl. No. 14/214,147, filed Mar. 14, 2014 Non-Final Rejection dated Oct. 23, 2015, all pages.
U.S. Appl. No. 14/214,147, filed Mar. 14, 2014 Final Rejection dated Dec. 10, 2015, all pages.
U.S. Appl. No. 15/198,796, filed Jun. 30, 2016 Non-Final Rejection dated Sep. 19, 2016, all pages.
U.S. Appl. No. 15/198,796, filed Jun. 30, 2016 Final Rejection dated Mar. 14, 2017, all pages.
U.S. Appl. No. 15/198,796, filed Jun. 30, 2016 Non-Final Rejection dated Aug. 24, 2017, all pages.
U.S. Appl. No. 15/198,796, filed Jun. 30, 2016 Final Rejection dated Dec. 12, 2017, all pages.
U.S. Appl. No. 15/198,796, filed Jun. 30, 2016 Non-Final Rejection dated May 11, 2018, all pages.
U.S. Appl. No. 15/198,796, filed Jun. 30, 2016 Notice of Allowance dated Jan. 2, 2019, all pages.

* cited by examiner

SYSTEMS AND METHODS FOR PROVIDING INFORMATION RELATED TO TAGGED ITEMS REPRESENTED IN VIDEO STREAM CONTENT

CROSS-REFERENCES TO RELATED APPLICATION

This Application is a continuation of U.S. nonprovisional application Ser. No. 15/198,796, filed Jun. 30, 2016, entitled "SYSTEMS AND METHODS FOR PROVIDING INFORMATION RELATED TO TAGGED ITEMS REPRESENTED IN VIDEO STREAM CONTENT," which application is a continuation of U.S. nonprovisional application Ser. No. 14/214,147, filed Mar. 14, 2014, entitled "SYSTEMS AND METHODS FOR PROVIDING INFORMATION RELATED TO TAGGED ITEMS REPRESENTED IN VIDEO STREAM CONTENT," now U.S. Pat. No. 9,420,343, issued Aug. 16, 2016, which claims priority to U.S. provisional application 61/790,701, filed Mar. 15, 2013, entitled "TAGGED TELEVISION PROGRAMMING STREAMS," the entire disclosures of which are hereby incorporated by reference for all purposes.

BACKGROUND

The present disclosure relates in general to television devices, and, more specifically, but not by way of limitation, to television programming streams.

As value, use, access, and demand corresponding to information continue to increase, television viewers have come to expect that their television receivers offer a number of robust and useful features. Additionally, advertisers demand more of the products and services they use than ever before. Companies are expected to compete to provide greater and greater levels of accuracy and more tailored service offerings. Accessing sources of information that have traditionally been unavailable is now expected. There is a need in the television service provider space to provide enhanced access to information.

BRIEF SUMMARY

The present disclosure relates in general to television devices, and, more specifically, but not by way of limitation, to television programming streams.

In one aspect, a method for directed advertising via a tagged video stream is disclosed. Content and a tag associated with a product represented by at least a portion of the content may be received by a media device. The media device may be associated with at least one end user. The content may correspond to television programming. The content may be output by the media device for display. A user selection corresponding to the tag associated with the product represented by at least the portion of the content may be processed by the media device. The user selection may be received during display of at least the portion of the content. Responsive to the user selection, the media device may facilitate provision of information related to the product represented by at least the portion of the content to a second device and/or an account associated with the at least one end user.

In another aspect, a media device to facilitate directed advertising via a tagged video stream is disclosed. The media device may include one or more processors and a memory communicatively coupled with and readable by the one or more processors and having stored therein processor-readable instructions which, when executed by the one or more processors, cause the one or more processors to perform one or more of the following. Content and a tag associated with a product represented by at least a portion of the content may be received. The media device may be associated with at least one end user. The content may correspond to television programming. The content may be output for display. A user selection corresponding to the tag associated with the product represented by at least the portion of the content may be processed. The user selection may be received during display of at least the portion of the content. Responsive to the user selection, provision of information, the information being related to the product represented by at least the portion of the content to a second device and/or an account associated with the at least one end user, may be facilitated.

In yet another aspect, a non-transitory processor-readable medium is disclosed. The non-transitory processor-readable medium may include processor-readable instructions which, when executed by one or more processors, cause the one or more processors to perform one or more of the following. Content and a tag associated with a product represented by at least a portion of the content may be received. The content may correspond to television programming. The content may be output for display. A user selection corresponding to the tag associated with the product represented by at least the portion of the content may be processed. The user selection may be received during display of at least the portion of the content. Responsive to the user selection, provision of information, the information being related to the product represented by at least the portion of the content to a device and/or an account associated with at least one end user, may be facilitated.

In some embodiments, the device or second device may be a mobile computing device or a display associated with the media device. In some embodiments, the facilitating provision of the information related to the product may include processing the information related to the product and transmitting the information related to the product to the device. In some embodiments, the facilitating provision of the information related to the product may include transmitting an indication, based at least in part on the tag, to a service provider system to prompt the provision of the information related to the product represented by at least the portion of the content to the second device and/or the account associated with the at least one end user. In some embodiments, the indication to the service provider system may further prompt updating of a database to indicate an association between the tag and the account associated with the at least one end user. In some embodiments, the indication may include account information and tag information. In some embodiments, the information related to the product may include a link to data maintained by a provider associated with the product.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
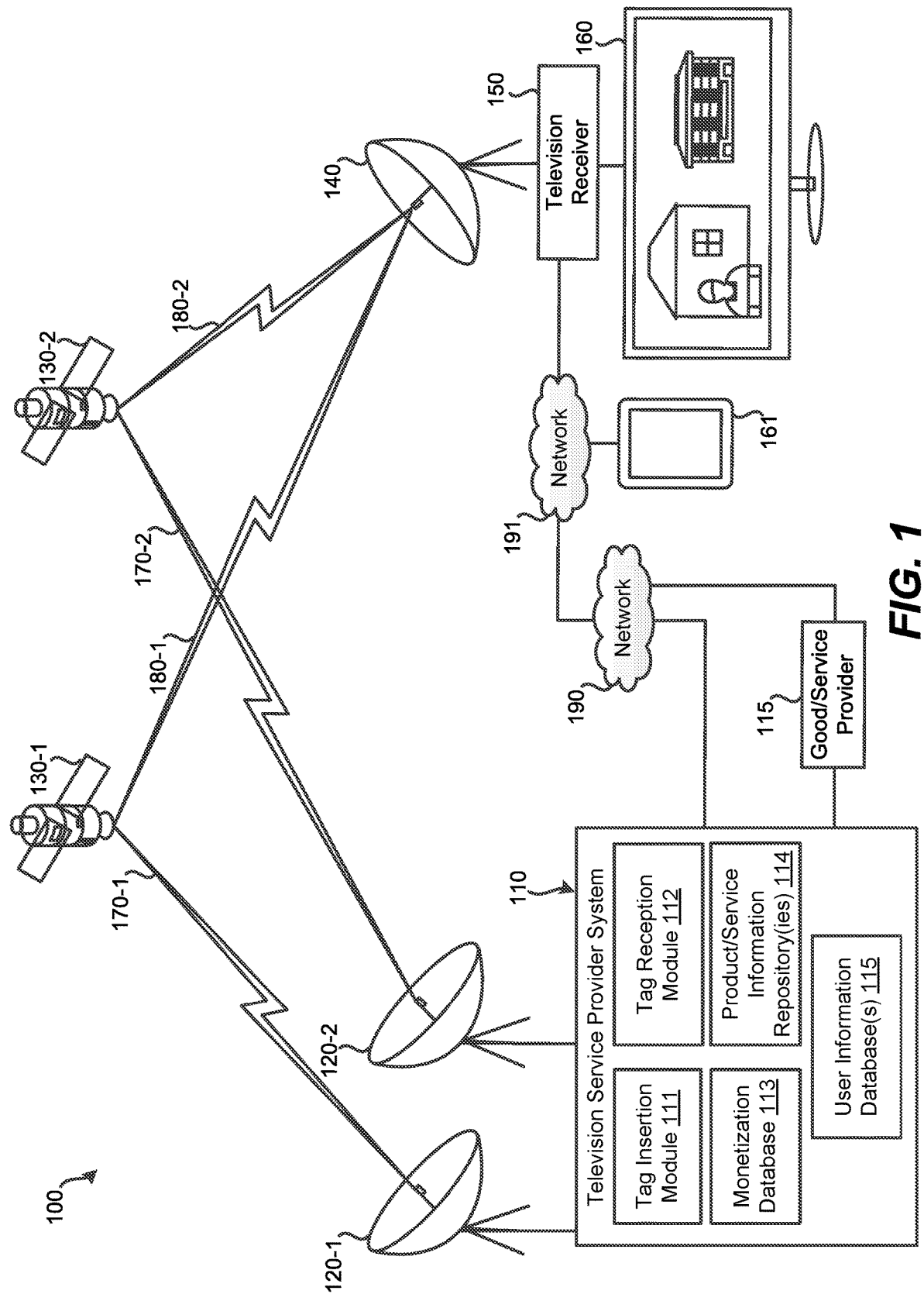
FIG. 1 shows an example media content distribution system, in accordance with certain embodiments of the present disclosure.

Content provided to television receivers by a television service provider may be tagged. Such tags may be used for directed advertising. For example, a tag may be associated a product or service associated with a particular commercial. A tag may also be associated with a product or service associated with content within a television program (e.g., a dress an actress is wearing). By a user providing input via a user interface during a period of time during which content associated with the tag is presented, the user may be provided additional information about the product or service. Additionally, for providing such additional information about the product, the television service provider may collect a fee from the goods or service provider associated with the tag.

If a user provides input via the user interface (e.g., a selection of user-selectable option associated with particular product-related content being presented) that may trigger a request for tag information, the tag which is currently active (e.g., associated with the period of time during which the user input was received) may be indicated to the television service provider in some embodiments. The television service provider may store data indicating a user account and the tag associated with the request from the television receiver. Additional data about the product or service may be provided to the user. In some embodiments, such additional information is transmitted to an email account of the user (which email account may have been previously linked to the user account or may be provided by user via one or more user-selectable options at a time corresponding to user selection of tagged content) and/or may be made available via a specialized application on a computerized user device (e.g., a tablet computer). In some embodiments, the user device and/or the television display device is provided with a link, which directs the user to a website associated with the goods or service provider. The television service provider may receive a first fee if the user requests information related to the tag and a second (possibly greater) fee if the user actually accesses information on the product or service (e.g., via the link). As such, the link may access a system of the television service provider but may be redirected or forwarded to a website associated with the goods or service provider, thus allowing the television service provider to log whether the user has accessed the link.

In some embodiments, if the television receiver is not connected with the Internet, information may be transmitted locally, via a local network, to a user device. This information may include additional information about where the user can learn information about the product or service associated with the tag. In some embodiments, a link may be presented to a user via a display device. This link may be specific to the product and/or the user account. By using this link, the user may gain information about the product and/or service and, in some cases, could be presented with purchase options. The television service provider may receive a fee if the user accesses the link for information on the product or service. As such, the link may access a system of the television service provider but may be redirected or forwarded to a website associated with the goods or service provider, thus allowing the television service provider to log whether the user has accessed the link.

FIG. 1 illustrates a satellite television distribution system 100, in accordance with certain embodiments of the present disclosure. While embodiments detailed herein may be applied to various television distribution systems, including cable and IP, a satellite television distribution system is provided as an example. Satellite television distribution system 100 may include: a television service provider system 110, satellite transmitter equipment 120, satellites 130, a satellite dish 140, a television receiver 150, and a display device 160. Alternate embodiments of satellite television distribution system 100 may include fewer or greater numbers of components. While only one satellite dish 140, television receiver 150, and display device 160 (collectively referred to as "user equipment") are illustrated, it should be understood that in actual practice multiple (e.g., tens, thousands, millions) pieces of user equipment may receive television signals from satellites 130. And, while FIG. 1 illustrates an example of a satellite-based television channel distribution system, it should be understood that certain embodiments of the present disclosure could be implemented in other content distribution systems, such as cable television distribution systems.

Television service provider system 110 and satellite transmitter equipment 120 may be operated by a television service provider. A television service provider may distribute television channels (e.g., broadcast television programming), on-demand television/movie programming, audio programming (e.g., music), programming information (e.g., electronic programming guides), and/or other services to users/subscribers. Television service provider system 110 may receive feeds of one or more television channels from various sources. To distribute television channels to users, feeds of the television channels may be relayed to user equipment via satellite transmitter equipment 120, uplink signals 170, satellites 130 and satellite transponder streams 180.

Figure 2:
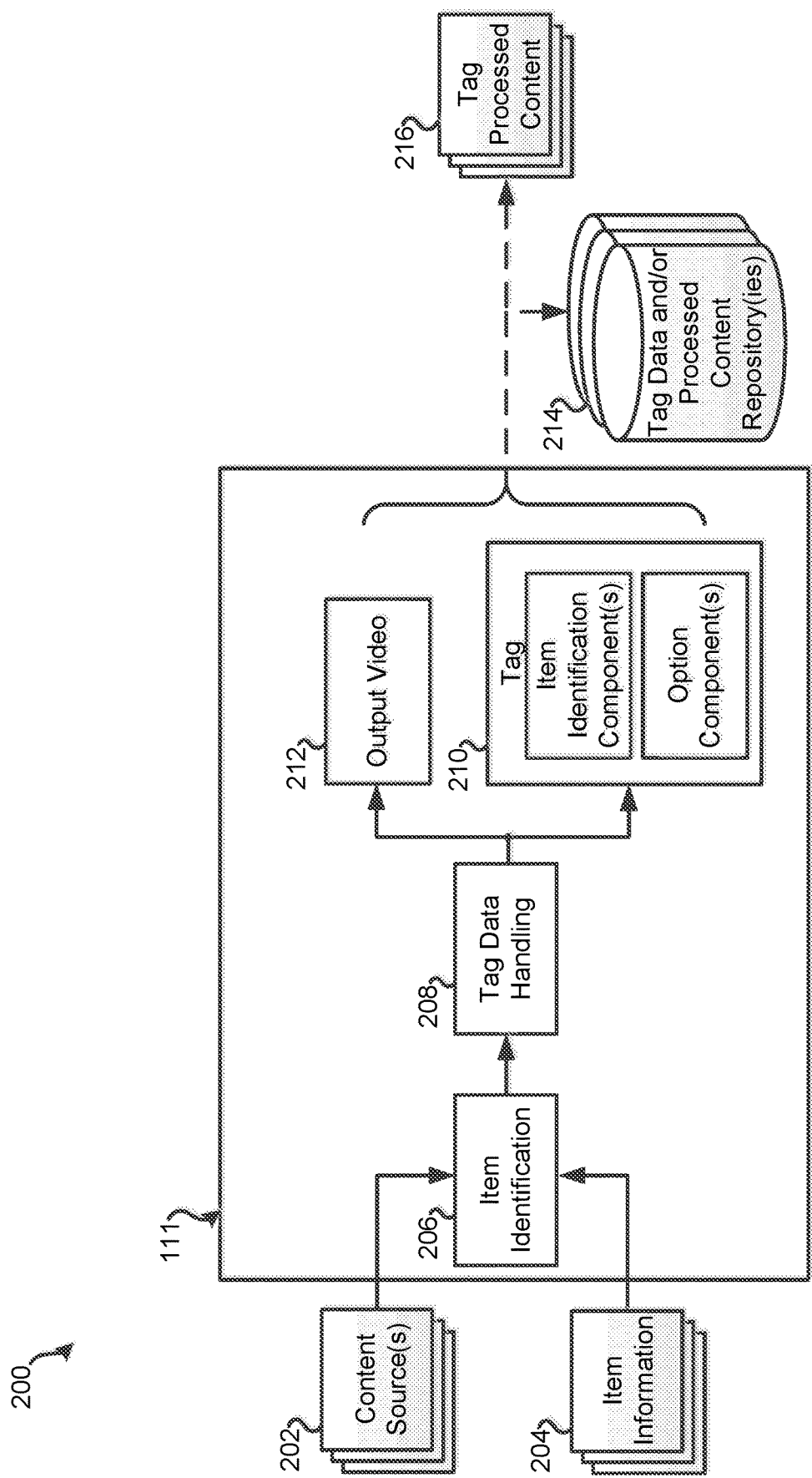
FIG. 2 is a simplified illustration of an embodiment of a content handling system, in accordance with certain embodiments of the present disclosure.

Television service provider system 110, in addition to providing data streams of television programming to television receiver 150 via satellite may be configured to insert tags into the data stream of television programming using a tag insertion module 111. FIG. 2 is a simplified illustration of an embodiment of a content handling system 200, in accordance with certain embodiments of the present disclosure. In certain embodiments, the content handling system 200 may be included in the television service provider system 110. In certain embodiments, the content handling system 200 may be separate from, and provide content to, the television service provider system 110. In certain embodiments, the content handling system 200 may be included in the end-user system and may be included in the television receiver 170. In certain embodiments, various features of the content handling system 200 may be distributed between the television tuner device 170 and upstream of the television tuner device 170.

The content handling system 200 may process content and provide tagged content. In some embodiments, the processing of content and provision of tagged may be performed by the tag insertion module 111. The tag insertion module 111 may include instructions retained in a computer-readable media and to be executed by one or more processors. The content handling system 200 may receive one or more content sources 202, which may correspond to movies, television programs, portions thereof, etc. The content sources 202 may include various components, including without limitation, one or more video tracks, audio tracks, metadata tracks, close captioning information, and/or the like. In some embodiments, the content handling system 200 may retain received content sources 202 in one or more content repositories (not shown). The content repositories may include any suitable form of storage media, such as any suitable form disclosed herein.

The content handling system 200 may receive item information 204. The item information 204 could correspond to any suitable information about items represented in the content. The item information 204 could indicate which items represented in the content are to be tagged. In some embodiments, the item information 204 could have originated at least in part from the good/service provider 115. Alternatively or additionally, the item information 204 could be input by the television service provider system 110, automatically or manually by an agent thereof.

The content handling system 200 may generate one or more tags 210 corresponding to the items in the content and may output tag processed content 216. The tag processed content 216 may include the one or more tags 210. For example, the one or more tags 210 could be inserted into the content stream or could be sent separately from the content stream in various embodiments. In some embodiments, the tag processed content 216 may be stored at least temporarily in one or more repositories 214. In some embodiments, tag data may be stored at least temporarily in one or more repositories 214. The tag data retained could be retained in whole or in part, for example, for recordkeeping and/or to facilitate a tag reception module 112 of the television service provider system 110 discussed further herein.

The content handling system 200 may include an item identification component 206 that may identify one or more items to be tagged based at least in part on the item information 204. In some embodiments, the item identification component 206 may be configured to examine video content of a content source 202 for one or more items to be tagged. In some embodiments, the item information 204 may sufficiently identify one or more items in the video content such that the video content need not be examined. The item identification component 206 may receive or assign packet identifiers to identify data of the content that is to be transmitted as part of a data stream to a television receiver and that is to be associated with one or more tags.

The content handling system 200 may include a tag data handler 208 that may generate one or more tags 210 corresponding to the items in the content. In some embodiments, the one or more tags 210 may be inserted into the output video content 212. In some embodiments, the one or more tags 210 may not be inserted into the output video content 212 but may be sent with the output video content 212.

Data transmitted as part of a data stream to a television receiver may be packetized and assigned packet identifiers. A particular packet identifier may be associated with data packets related to tags for a particular television channel. Tag data may include or otherwise be associated with a tag identifier and may include item identification component(s) that facilitate identification of tagged items in any suitable manner. For example, tag data may include any one or combination of a packet identifier, an indication of a period of time (or other measure of time, e.g., a number of frames), a start frame, an end frame, and/or the like.

In some embodiments, a tag inserted into a data stream, which may be a transponder stream related to television receiver 150 via a transponder of a satellite, may be associated with a period of time. If, during the period of time associated with the tag while viewing the television channel associated with the tag (in some embodiments, regardless of whether the broadcast of the television channel is being viewed live or a recording made by the television receiver), a user provides input corresponding to a selection of a user-selectable option presented with content being presented with the display device 160 and/or 161, the selection may correspond to a request for information about the tag to television receiver 150. In response to the selection, information about the product or service associated with the tag may be provided to the user.

In some embodiments, tag data could define one or more areas within frames that correspond to certain objects represented within the frames. For example, a dress worn by an actress could be represented within the frames, and the tag data could define the area within the frame that corresponds to the representation of the dress. Such tag data could define the area of interest in any suitable way in various embodiments which could be by way of any one or combination of mattes, masks, pixel identification (which could, for example, include identification of pixel coordinates and ranges thereof to define areas of interest), pixel color component characteristics such as color component values, overlays, and/or the like, allowing for correlation of a user selection to the area of interest in any suitable way. In some embodiments, a processor (such as a main processor, a core processor, digital signal processor, and/or like) may take a definition of the area of interest with respect to one or more reference frames and may perform auto-correlation of related images in a video stream to identify/define the areas of interest in other frames of the video sequence that represent an item of interest. Image characteristics (e.g., color, brightness, etc.) of the area of interest with respect to the reference frame(s) could be measured, quantified, and/or otherwise identified, and matched with measured image characteristics of the other frames to define the area of interest in multiple frames in an image-changing sequence. Accordingly, certain embodiments may allow for handling the complexity of multiple on-screen options by differentiating particular items with tracking information in dynamic, image-changing content.

In some embodiments, additional data about the product or service related to the tag may be transmitted to television receiver 150, such as a photograph or image, a description, pricing information, a link to a webpage selling the product, etc. For example, in some embodiments, tag data may include one or more option components corresponding to the tagged items. The option components could include additional data about the product or service related to the tag. In various embodiments, the option components may include any suitable information, which may include without limitation any one or combination of logic, links, content, instructions, specifications, other indications, and/or the like to facilitate user-selectable options presentable via the television receiver. In some embodiments, one or more option components may be separate from the associated identification components of a tag and may be transmitted separately to the television receiver.

Referring again to FIG. 1, in some embodiments, an indication of the tag (e.g., an identifier) and an indication of a user account associated with television receiver 150 may be transmitted to a tag reception module 112 of the television service provider system 110. This communication may occur via one or more networks separate from the satellite-based television programming distribution network. For example, a local wireless network 191 (e.g., an 802.11 home network) and network 190 which may be the Internet, may be used for bidirectional communication between television receiver 150 and the tag reception module 112 of the television service provider system. The tag reception module 112 may make an entry in monetization database 113 indicating the user account and the tag requested.

The television service provider system may send additional information about the product or service related to the tag to a separate device of the user. One or more product/service information repositories 114 may retain additional information about the product or service. In some embodiments, such additional information could have originated at least in part from the good/service provider 115. Alternatively or additionally, such additional information could be gathered by the television service provider system 110.

A separate computerized device associated with the user account may be determined. One or more user information databases 115 may any suitable information about users to facilitate embodiments of this disclosure. User information may include any one or combination of user account information, contact information (such as linked email account information, telephone information, etc.), notification preferences (such as whether the user has accepted email notifications, push notifications, text message notifications, etc. as means of relaying information corresponding to tag selections), user profile information (such as information relating to different user profiles set up for different members of a family), location information, user viewing intelligence data, user tag selection data (such as selection statistics, interest data corresponding to selections such as categories of interests, option selection history, etc.), end-user device/configuration information, and/or the like. In some embodiments, a user may have a specialized application installed on a device, such as a smartphone or tablet computer, that is configured to receive data related to tags that the user has previously selected. In some embodiments, the information about the product or service is routed to an email address of the user, such that the information may be accessed by the user via whichever arrangement the user typically uses to access email. For example, whether a specialized application is user-installed, a webpage, or email, a user may use computerized user device 161 to receive the information about the product or service related to the tag. Upon accessing the specialized application, email, or logging in to a webpage, the user may be presented with additional information about the product or service linked with the tag. If such additional information about the product or service is accessed, television service provider system 110 may make an additional entry in the monetization database 113 indicating that additional information regarding the product or service has been received by the user.

In some embodiments, the television service provider may receive advertising revenue from such insertion of tags into the data stream. Payment to the television service provider for such advertising may be based on the number of user who: provide input requesting information about the product or service and/or the number of users who actually view the additional information about the product or service. The television service provider may receive more revenue when the additional information is actually viewed or otherwise accessed by a user. A product or service provider 115 may request the advertising and may pay a fee at least partially based on the number of users who provided input requesting information related to the tag and/or based on the number of user who actually accessed the additional information about the product or service.

In some embodiments, the television service provider may provide a redirect service. Rather than providing additional information about a product or service in response to a request related to a specific tag from a user, the television service provider may redirect the user to a website maintained by the product or service provider 115. The television service provider may note the redirect in monetization database 113 to be used for billing purposes with the product or service provider 115. Regardless, from the user's point of view, by providing input while a tag is active (e.g., during the period of time associated with the tag) of a particular television channel, the user is provided the opportunity to view additional information about the related product or service via another device, such as computerized user device 161.

In some embodiments, in addition to a tag, additional data about a product or service is transmitted via satellite (or some other form of television programming distribution) to television receiver 150. This additional information may be unacces se d unless a user provides input selecting a tag during the period of time associated with the tag.

If the user input is selected, additional data about the product or service may be transmitted from television receiver 150 to computerized user device 161 via network 191 without using network 190. In such embodiments, network 191 may represent a direct connection, such as WiFi DIRECT, a BLUETOOTH communication link, or near-field communication. In some embodiments, although not explicitly shown in FIG. 1, the television receiver 150 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the television receiver 150 may be configured to include any number of other various components or logical modules that are implemented in hardware, software, firmware, or any combination thereof, and such components or logical modules may or may not be implementation-specific. In some embodiments, the computerized user device 161 could have remote control functionality enabling communication with the television receiver 150 to control the television receiver 150, and such control could be provided by way of a touchscreen of the computerized user device 161, for example. In some embodiments, streaming video service, which could include content recorded via the DVR of the television receiver 150, could be provided to the computerized user device 161 by way of the network 190, 191, and/or another network.

In some embodiments, television receiver 150 may present a link in response to user input selecting a tag. The link, if accessed by the user, may identify the tag and the user account. This link may be directed to a webpage maintained by the television service provider, which may in turn redirect to a webpage operated by the product or service provider. First directing to a webpage operated by the television service provider may allow the television service provide to store data indicating that a user associated with the user account has requested additional information about the product or service associated with the tag, thus allowing the tags to be monetized.

In some embodiments, certain user information may be gathered by the tag reception module 112 and retained in the one or more user information repositories 115. The tag reception module 112 may use the user information to for targeted advertising directed to particular users/end-user equipment. Advertising content could be provided by the good/service providers 115 and retained in the one or more product/service information repositories 114, in certain embodiments. Banner ads, for example, or any suitable advertising, could be directed based on user tag selection data. Past tag selection data could be characterized and correlated to certain interests and/or interest categories. Advertising content may be selected based at least in part on the user tag selection data and/or any other suitable user information. For example, an end user may indicate an interest in particular categories of items (say, female apparel) by selecting tags related to that category (say, tags related to actresses' clothing), and advertising content related to female apparel may be selected for the particular end user.

The selected advertising content could be delivered for an end user in various ways according to various embodiments. In some embodiments, the selected advertising content may be transmitted via any one or combination of text message, push notification, email, the end-user computing device 161, a specialized application thereof, etc., for example, based at least in part on the user's notification preferences. In some embodiments, the selected advertising content may be transmitted via the television receiver 150. For example, advertising content could be conveyed via an unused tuner of the television receiver 150. Advertising content could be conveyed with EPG information. In some embodiments, the advertising content could include a video/audio-video stream. The stream and/or other advertising content could be an overlay that is presented with the display 160 in a part of the screen (such as a picture-in-picture window, a screen border, a pop-up, etc.). The advertising content could be presented during full-screen viewing and/or EPG viewing.

Computerized user device 161 may permit a user to view information about the product or service tagged, and/or related advertising content, without interrupting playback or a broadcast of television programming. Further, information about the product or service and/or related advertising content may be made available to the user via computerized user device 161 while television programming is being output by television receiver 150 or, if the user prefers, the information about the product or service may be made available to the user at a later time when the user chooses to access the information via computerized user device 161.

Receiving equipment may be configured to decode signals received from satellites 130 via satellite dish 140 for display on a user display device, such as display device 160. Receiving equipment (which is illustrated in FIG. 1 by television receiver 150), may be incorporated as part of a television or may be part of a separate device, commonly referred to as a set-top box (STB). Receiving equipment may include a satellite tuner configured to receive and to decode signals representing television channels, and a digital video recorder DVR configured to record and store television and other broadcast content. As such, television receiver 150 may decode signals received via satellite dish 140 and provide an output to display device 160. While FIG. 1 illustrates an embodiment of television receiver 150 as separate from display device 160, it should be understood that, in other embodiments, similar functions may be performed by a television receiver integrated with display device 160. Display device 160 may be used to present video and/or audio decoded by television receiver 150. In some embodiments, the display device may be a television, monitor, or some other device that is configured to display video.

Network 190 may serve as a secondary communication channel between television service provider system 110 and television receiver 150. Via such a secondary communication channel, bidirectional exchange of data may occur. As such, user feedback and other user data may be transmitted to television service provider system 110 via network 190. Data may also be transmitted from television service provider system 110 to television receiver 150 via network 190. Network 190 may be the Internet.

Figure 3:
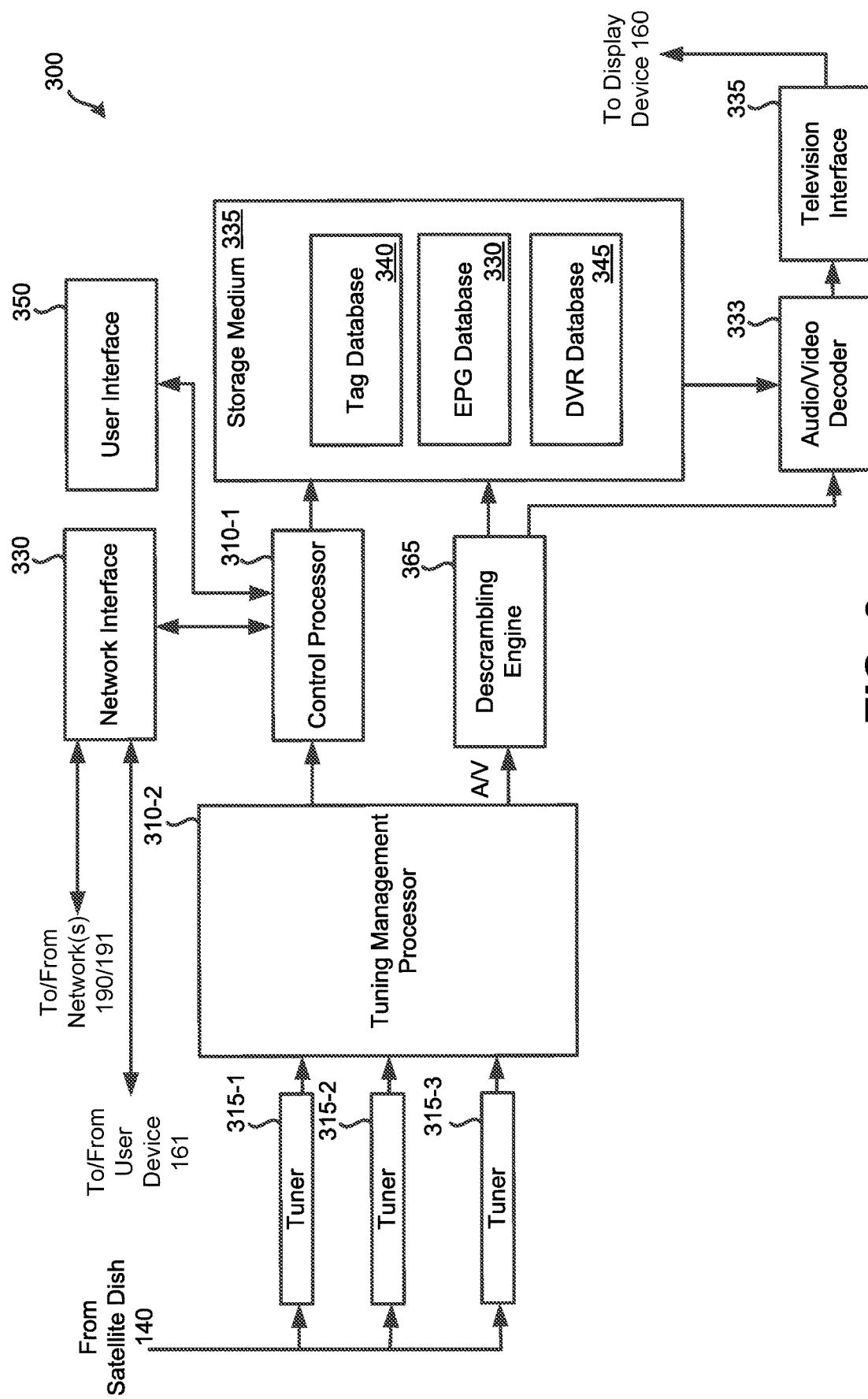
FIG. 3 shows a simplified block diagram of a television receiver, in accordance with certain embodiments of the present disclosure.

FIG. 3 illustrates a block diagram of an embodiment of a television receiver 300. Television receiver 300 may be in the form of a separate device (e.g., such as the separate television receiver 150 illustrated in FIG. 1 that is a set top box) configured to be connected with a presentation or user device, such as display device 160 of FIG. 1. Alternatively, television receiver 300 may be incorporated into another device, such as display device 160. Television receiver 300 may include: processors 310, tuners 315, network interface 320, storage medium/memory system 325, audio/video decoder 333, television interface 335, user interface 350, and/or descrambling engine 365.

Processors 310 may include one or more general-purpose processors configured to perform processes such as tuning to a particular channel, displaying an electronic programming guide (EPG), and/or receiving and processing input from a user or control information from television service provider system 110. Processors 310 may include one or more special purpose processors. For example, processors 310 may include one or more processors dedicated to decoding video signals from a particular format, such as MPEG, for output and display on a television and for performing decryption.

Tuners 315 may include one or more tuners used to tune to television channels, such as television channels transmitted via satellite or cable. Each tuner contained in tuners 315 may be capable of receiving and processing a stream of data in a satellite transponder stream 180 (or a cable RF channel).

Network interface 320 may be used to communicate via an alternate communication channel with television service provider system 110, such as via the network 190 seen in FIG. 1. For example, while the primary communication channel may be one or more of the satellites 130 (which may be unidirectional to the television receiver 300), an alternate communication channel (which may be bidirectional) may be via a network 190 and network interface 320. Network interface 320 may be configured to communicate with networks 190 and/or 191. Network interface 320 may communicate via network 191 with computerized user device 161. In some embodiments, network interface 320 may communicate directly (e.g., via a wire or wirelessly) with computerized user device 161.

Storage medium 325 may represent database or memory systems having computer readable storage medium. Storage medium 325 may include memory and/or a hard drive. Storage medium 325 may be used to store information received from one or more satellites and/or information received via network interface 320. Storage medium 325 may store information related to an electronic programming guide (EPG) in an EPG database/storage 330, and/or recorded television programs (and related control information) in a DVR database/storage 345. While not illustrated, the storage medium 325 may also include separate memory for storing data and instructions (other than those relating to the illustrated EPG or DVR functions) for use in various processes carried out by the television receiver 300. As should be apparent, and as a result of the processing and various storage functions illustrated (such as DVR database 345), the television receiver 300 may perform, among other things, functions commonly thought of as being those associated with a discrete digital video recorder (DVR) device.

EPG database 330 may store information related to television channels and the timing of programs appearing on such television channels. EPG database 330 may be used to inform users of what television channels or programs are available and/or provide recommendations to the user. EPG database 330 may provide the user with a visual interface displayed by display device 160 that allows the user to browse and select television channels and/or television programs for viewing at display device 160 and/or recording via DVR database 345. In one embodiment, the visual interface may allow a user to select television programs for which commercials are to be automatically skipped. Information used to populate EPG database 330 may be received via network interface 320 and/or via satellites, such as satellites 130 of FIG. 1 via tuners 315. For instance, updates to EPG database 330 may be received periodically via satellite.

Tag database 340 may receive and store, at least temporarily, tag data. Tag database 340 may be configured to receive data from packets identified with a particular PID. A table, such as a network information table, program map table, or program access table, may indicate a PID associated with tags for a particular television channel. Packets for such a television channel may be ignored unless the television channel is being recorded or the broadcast of the television channel is being output live. In some embodiments, for a tag, tag database 340 may indicate: an identifier of the tag (e.g., an identifier that can be distinguished from identifiers linked with other tags), and a time period. In some embodiments, for a given television channel, only a single tag may be active at a time. In other embodiments, multiple tags may be active simultaneously, for example, when user-selectable options are provided in relation to concurrently portrayed products. A tag may be active over a time period, which may be defined in terms of absolute time (e.g., seconds), frames, or some other measure that can be converted to time. For instance, a tag may indicate a start time (e.g., an absolute time, a frame identifier, or some other measure) and the period of time. The tag data could indicate a time period by way of ordinal frame sequencing, frame time coding, display time, and/or in any suitable manner.

In some embodiments, during a period of time when a user-selectable option is available to a user, if a user provides input selecting the tag (e.g., presses a dedicated "tag" button on a remote control in communication with the television receiver), this active tag would be selected. If multiple user-selectable options are available simultaneously, one or more buttons on a remote control could be used to select a particular user-selectable option. In addition or in alternative, one or more user-selectable options may be available during the time period for on-screen selection via a remote control and a selection function (e.g., an on-screen selector such as a hovering indicator of any suitable form) and/or one or more buttons on television receiver 300 that allows a user to interact with television receiver 300. In some embodiments, an indication of the user-selectable option associated with an item represented on-screen could be presented to indicate that the user may select an option to obtain further information. Any suitable indication of the user-selectable option may be employed, such as a highlighting of the item, for example, with an outline of a distinguishing color, a star, a flag, a pop-up notification near the item and/or near the border of the screen, etc. In some embodiments, by hovering over an item represented on-screen with a selector tool, an indication of the user-selectable option (which could be a second indication in some implementations) may be presented, prompting the user to select the option if desired. Such an indication of the user-selectable option could include textual descriptive information. In addition or in alternative, one or more user-selectable options may be available during the time period for selection via a specialized application on a computerized user device (e.g., a tablet computer).

Associated with the tag, tag database 340 may also store: information about the product or service, and/or information sufficient to generate a link (particular to the user account associated with television receiver 300 and the product or service linked with the tag). In some embodiments, a link could direct the user to a website associated with the goods or service provider. The user could access the website or other information for display with the television display and/or the computerized user device.

Audio/video decoder 333 may serve to convert encoded video and audio into a format suitable for output to a display device. For instance, audio/video decoder 333 may receive MPEG video and audio from storage medium 325 or descrambling engine 365 to be output to a television. Audio/video decoder 333 may convert the MPEG video and audio into a format appropriate to be displayed by a television or other form of display device and audio into a format appropriate to be output from speakers, respectively.

Television interface 335 may serve to output a signal to display device 160 (or another form of display device) in a proper format for displaying of video and for playing audio to the user/viewer. As such, television interface 335 may output one or more television channels and may output stored television programing from storage medium 325 (e.g., from DVR database 345 and/or information from EPG database 330) to a television for presentation.

Digital video recorder (DVR) database 345 may permit a television channel to be recorded for a period of time. DVR database 345 may store timers that are used by processors 310 to determine when a television channel should be automatically tuned to and recorded to DVR database 345 of storage medium 325. Timers may be set by the television service provider and/or one or more users of the television receiver 300. DVR database 345 may be configured by a user to record particular television programs, for later playback at the convenience of the user.

User interface 350 may include a remote control (physically separate from television receiver 300) and/or one or more buttons on television receiver 300 that allows a user to interact with television receiver 300. Among other things, a user interface 350 may be used to select for viewing a television channel as it is broadcast, for interacting with data in EPG database 330, and/or for viewing programs recorded at DVR database 345. User interface 350 may have a dedicated button that allows a user to select a tag with a single action. As such, selecting a tag may involve the user only pressing a single button once. This may trigger information about the product or service related to the tag to be made available to the user via a link and/or additional information presented via a separate computerized user device.

Descrambling engine 365 is used to descramble video and/or audio corresponding to television channels for storage and/or presentation. Video and/or audio data contained in the transponder stream 180 received by tuners 315 may be scrambled by the service provider. The video and/or audio may be descrambled by descrambling engine 365 using a scramble control identifier present within the data packet containing the scrambled video or audio, in conjunction with encryption keys/control words stored at the television receiver 300. Descrambled video and/or audio may be output by descrambling engine 365 to storage medium 325 for storage (at DVR database 345) and/or to audio/video decoder 333 for output to display device 160 or other presentation equipment via television interface 335.

For ease of description, television receiver 300 of FIG. 3 has been reduced to a block diagram, and some parts not necessary for understanding the embodiments of the present disclosure have been omitted. In other embodiments of television receiver 300, fewer or greater numbers of components may be present, and various illustrated modules of television receiver 300 may be combined into a fewer number of modules or divided into a greater number of modules. Also, it should be understood that the various components of television receiver 300 may be implemented using hardware, firmware, software, and/or some combination thereof. For example, functions of EPG database 330 and DVR database 345 may have their functions performed using, in part, instructions or processes executed by one or more of the processors 310. Further, some routing between the various modules of television receiver 300 has been illustrated. Such illustrations are for exemplary purposes only. Two modules not being directly or indirectly connected does not indicate the modules cannot communicate. Rather, connections between modules of the television receiver 300 are intended only to indicate possible common data routing.

Figure 4:
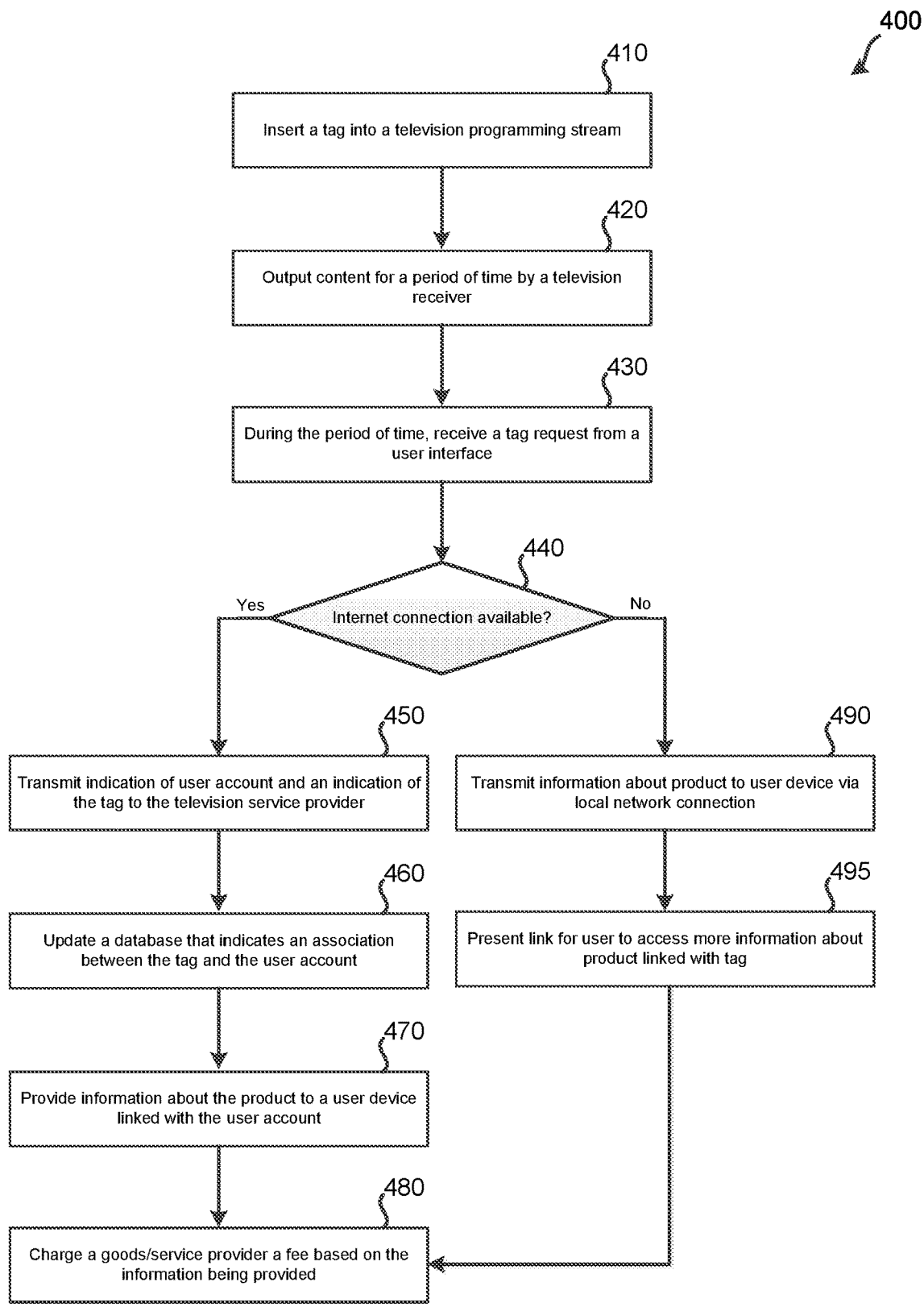
FIG. 4 shows an example method, in accordance with certain embodiments of the present disclosure.

FIG. 4 illustrates an embodiment of a method 400 which may be performed using the systems, components, and/or devices of FIGS. 1-2. One or more instances of components of computer system 500 of FIG. 5 may be used in performing method 400. Teachings of the present disclosure may be implemented in a variety of configurations that may correspond to the systems disclosed herein. As such, certain steps of the method 400, and the other methods disclosed herein, may be omitted, and the order of the steps may be shuffled in any suitable manner and may depend on the implementation chosen. Moreover, while the following steps of the method 400, and those of the other methods disclosed herein, may be separated for the sake of description, it should be understood that certain steps may be performed simultaneously or substantially simultaneously.

According to one embodiment, the method 400 may begin at step 410. At step 410, one or more tags may be inserted into a television programming stream by a television service provider. For each of the one or more tags, a respective indication of the tag may be stored in a database by the television service provider, along with any suitable information associated with the tag such as that discussed herein. And, as discussed herein, in various embodiments, the tag may include a start point, a period of time, an identifier unique from other identifiers of other tags, and/or any suitable tag data.

At step 420, a data stream (e.g., a transponder stream) may be received by a television receiver and descrambled, and a television channel may be output for presentation via a display device. Content may be output for display during the period of time. The period of time may have some relation to the tag, for example, the product or service associated with the tag may be represented in the content during the period of time.

At step 430, a tag request may be received by the television receiver from a user interface, such as a user pressing a dedicated "tag request" button on a remote control, one or more other buttons on a remote control used to select a particular user-selectable option, one or more user-selectable options available via a computerized user device, and/or the like. It may be determined which tag with which the tag request is associated based on the time at which the tag request is received. If during the period of time, it is determined that the tag request is associated with the tag.

At step 440, in some embodiments, a determination is made as to whether an internet connection is available for the television receiver. If yes, method 400 proceeds to step 450. At step 450, an indication of the user account associated with the television receiver and the identifier of the tag may be transmitted to a television service provider system. At step 460, a database may be updated indicating that a user associated with the user account requested information on the tag. This information may be used for billing the advertiser associated with the tag.

At step 470, information about the product or service may be provided to a user device associated with the user account. In some embodiments, the information about the product or service associated with the tag is sent to an email account associated with the user account. In some embodiments, the relationship between the tag and the user account is stored at least until a user logs in via a specialized application or website, at which time additional information about the product or service may be provided. When such additional information is provided to the user, an additional entry may be made in the database, indicating that such additional information on the product or service has been provided to the user. The television service provider may be able to charge the advertiser an increased amount of money for such delivery of information. In some embodiments, the television service provider may redirect the user to a webpage operated by the advertiser of the goods or services. During these preceding steps, the television programming being output by the television receiver is unaffected, as such, the user providing a tag request does not negatively impact the viewing experience, regardless of whether the television program being viewed live or from a recording stored by the television receiver.

At step 480, the advertiser may be charged by the television service provider based on the number of tag requests and/or information about the product or service actually delivered based on the tag requests. For example, if a user provides a tag request but never views the additional information about the product or service, this may be of little to no benefit to the advertiser. As such, advertising fees may be at least partially based on whether the additional information was likely viewed by a user via a computerized user device.

If an internet connection is not available at step 440, method 400 may proceed to step 490. At step 490, information about the product or service may be transmitted to a user device via a local network or a direct connection. Such information may then be accessed by the user via, for example, a specialized application operating on the user device. In some embodiments, if a local network connection is not available and a direct connection to a user device is not available, a link may be presented on-screen (or available via a menu). Accessing the link may direct the user to a webpage operated by the television service provider, which may log that a user associated with the user account has requested additional information related to the tag (for billing the advertiser) and may redirect the user to a webpage operated by the advertiser associated with the goods or services.

Figure 5:
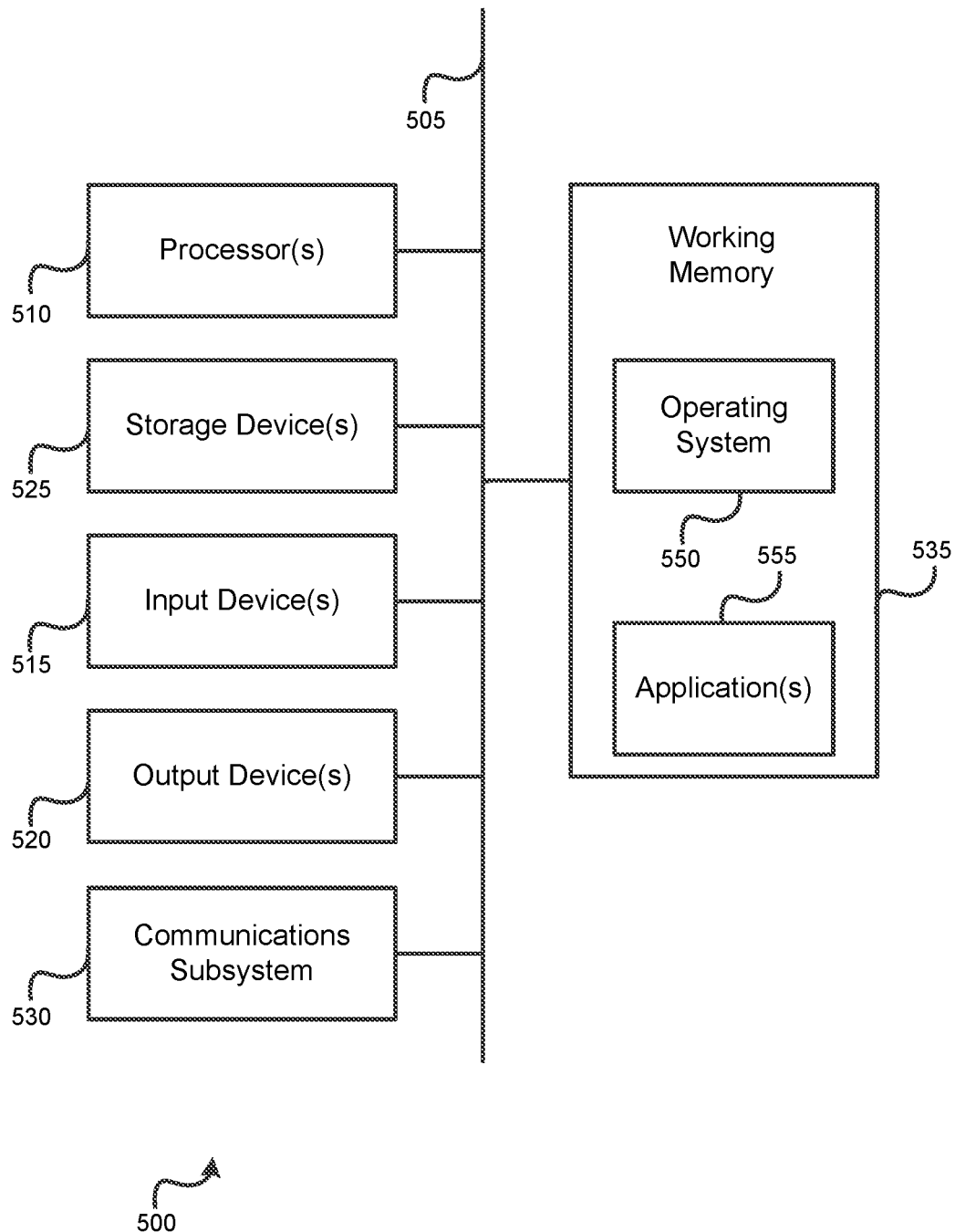
FIG. 5 shows an example computing system or device, in accordance with certain embodiments of the present disclosure.

A computer system as illustrated in FIG. 5 may be incorporated as part of the previously described computerized devices. For example, computer system 500 can represent some of the components of the television receivers, computerized user devices, and/or television service provider systems discussed in this application. FIG. 5 provides a schematic illustration of one embodiment of a computer system 500 that can perform the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the present disclosure. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Moreover, the teachings of the present disclosure may be applied not only to television programming, but also may be applied to any video stream. For example, the teachings may be applied to IP content, DVD content, etc. And, in addition, the teachings of the present disclosure are not limited to television receivers, but also may be applied to any media device and corresponding display method, including, by way of example without limitation, projectors, smart glasses, and the like.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of embodiments of the present disclosure. Also, a number of steps may be undertaken before, during, or after the above elements are considered. Accordingly, the above description does not bind the scope of the claims.

What is claimed:

1. A method comprising:

receiving, by a media device, content that corresponds to one or both of a movie and a television program, where at least a portion of the content received represents a product;

processing, by the media device, a tag associated with the content so that the tag defines one or more areas within frames of the content corresponding to the one or more areas representing the product in at least the portion of the content received;

outputting, by the media device, at least the portion of the content for presentation with a display device of video corresponding to the one or more areas representing the product, wherein the display device is communicatively coupled to the media device;

processing, by the media device, a user selection corresponding to at least the portion of the content representing the product, the user selection being received during display of at least the portion of the content;

consequent to the user selection, causing, by the media device, display of video content related to the product represented by at least the portion of the content in part of a screen of the display device during display of at least part of the content;

causing, by the media device, display of a prompt indicating that a user-selectable option corresponding to a second product is available, wherein the prompt visually distinguishes the second product from other items being displayed prior to any user selection corresponding to a tag associated with the second product represented in the content; and causing, by the media device, display of a second user-selectable option that, consequent to user selection of the second user-selectable option, causes provisioning of information related to the second product to a user device and/or an account associated with a user.

2. The method as recited in claim 1, wherein the video content related to the product is presented as an overlay in the part of the screen.

3. The method as recited in claim 2, wherein the overlay corresponds to a picture-in-picture window, a screen border, or a pop-up window.

4. The method as recited in claim 3, wherein the portion of the content is displayed so that video corresponding to the one or more areas representing the product is displayed while not displaying, at least initially, any indication of the tag associated with the content.

5. The method as recited in claim 3, further comprising:
outputting, by the media device, the content for display and causing display of a prompt indicating that a user-selectable option corresponding to the product is available, wherein the prompt visually distinguishes the product from other items being displayed prior to any user selection corresponding to the tag associated with the product represented by at least the portion of the content.

6. The method as recited in claim 3, wherein the causing display of the video content related to the product comprises causing display of a user-selectable option corresponding to the product, where the user-selectable option is associated with a link to further information associated with the product.

7. The method as recited in claim 3, wherein the tag defines one or more areas within frames of the content based at least in part on mattes, masks, pixel identification, or image characteristics corresponding to the one or more areas representing the product represented by at least the portion of the content received.

8. A media device comprising:
one or more processors; and
a memory communicatively coupled with and readable by the one or more processors and having stored therein processor-readable instructions which, when executed by the one or more processors, cause the one or more processors to perform:
processing content that corresponds to one or both of a movie and a television program, where at least a portion of the content received represents a product;
processing a tag associated with the content so that the tag defines one or more areas within frames of the content corresponding to the one or more areas representing the product in at least the portion of the content received;
causing output of at least the portion of the content for presentation with a display device of video corresponding to the one or more areas representing the product, wherein the display device is communicatively coupled to the media device;
processing a user selection corresponding to at least the portion of the content representing the product, the user selection being received during display of at least the portion of the content;
consequent to the user selection, causing display of video content related to the product represented by at least the portion of the content in part of a screen of the display device during display of at least part of the content;
causing display of a prompt indicating that a user-selectable option corresponding to a second product is available, wherein the prompt visually distinguishes the second product from other items being displayed prior to any user selection corresponding to a tag associated with the second product represented in the content; and
causing display of second user-selectable option that, consequent to user selection of the second user-selectable option, causes provisioning of information related to the second product to a user device and/or an account associated with a user.

9. The media device as recited in claim 8, wherein the video content related to the product is presented as an overlay in the part of the screen.

10. The media device as recited in claim 9, wherein the overlay corresponds to a picture-in-picture window, a screen border, or a pop-up window.

11. The media device as recited in claim 10, wherein the portion of the content is displayed so that video corresponding to the one or more areas representing the product is displayed while not displaying, at least initially, any indication of the tag associated with the content.

12. The media device as recited in claim 10, wherein the processor-readable instructions further cause the one or more processors to perform:
causing output of the content for display and causing display of a prompt indicating that a user-selectable option corresponding to the product is available, wherein the prompt visually distinguishes the product from other items being displayed prior to any user selection corresponding to the tag associated with the product represented by at least the portion of the content.

13. The media device as recited in claim 10, wherein the causing display of the video content related to the product comprises causing display of a user-selectable option corresponding to the product, where the user-selectable option is associated with a link to further information associated with the product.

14. The media device as recited in claim 10, wherein the tag defines one or more areas within frames of the content based at least in part on mattes, masks, pixel identification, or image characteristics corresponding to the one or more areas representing the product represented by at least the portion of the content received.

15. A non-transitory, processor-readable medium comprising processor-readable instructions which, when executed by one or more processors, cause the one or more processors to perform:
processing content that corresponds to one or both of a movie and a television program, where at least a portion of the content received represents a product;
processing a tag associated with the content so that the tag defines one or more areas within frames of the content corresponding to the one or more areas representing the product in at least the portion of the content received;
causing output of at least the portion of the content for presentation with a display device of video corresponding to the one or more areas representing the product, wherein the display device is communicatively coupled to the one or more processors;
processing a user selection corresponding to at least the portion of the content representing the product, the user selection being received during display of at least the portion of the content;
consequent to the user selection, causing display of video content related to the product represented by at least the portion of the content in part of a screen of the display device during display of at least part of the content;
causing display of a prompt indicating that a user-selectable option corresponding to a second product is available, wherein the prompt visually distinguishes the second product from other items being displayed prior to any user selection corresponding to a tag associated with the second product represented in the content; and causing display of a second user-selectable option that, consequent to user selection of the second user-selectable option, causes provisioning of information related to the second product to a user device and/or an account associated with a user.

16. The non-transitory, processor-readable medium as recited in claim 15, wherein the video content related to the product is presented as an overlay in the part of the screen.

17. The non-transitory, processor-readable medium as recited in claim 16, wherein the overlay corresponds to a picture-in-picture window, a screen border, or a pop-up window.

18. The non-transitory, processor-readable medium as recited in claim 17, wherein the portion of the content is displayed so that video corresponding to the one or more areas representing the product is displayed while not displaying, at least initially, any indication of the tag associated with the content.

19. The non-transitory, processor-readable medium as recited in claim 17, wherein the processor-readable instructions further cause the one or more processors to perform:
  causing output of the content for display and causing display of a prompt indicating that a user-selectable option corresponding to the product is available, wherein the prompt visually distinguishes the product from other items being displayed prior to any user selection corresponding to the tag associated with the product represented by at least the portion of the content.

20. The non-transitory, processor-readable medium as recited in claim 17, wherein the causing display of the video content related to the product comprises causing display of a user-selectable option corresponding to the product, where the user-selectable option is associated with a link to further information associated with the product.

* * * * *